United States Patent [19]
Lord et al.

[11] 4,322,750
[45] Mar. 30, 1982

[54] TELEVISION DISPLAY SYSTEM

[75] Inventors: Arthur V. Lord, Lower Kingswood; Kenneth Hacking, Tadworth; John O. Drewery, Coulsdon, all of England

[73] Assignee: British Broadcasting Corporation, London, England

[21] Appl. No.: 122,406

[22] Filed: Feb. 19, 1980

[30] Foreign Application Priority Data

May 8, 1979 [GB] United Kingdom ............... 15828/79

[51] Int. Cl.³ ............................................. H04N 5/02
[52] U.S. Cl. .................................................. 358/140
[58] Field of Search ......................................... 358/140

[56] References Cited

U.S. PATENT DOCUMENTS

| | | | |
|---|---|---|---|
| 4,057,835 | 11/1977 | Kinuhata | 358/140 |
| 4,057,836 | 11/1977 | Munsey | 358/140 |
| 4,125,862 | 11/1978 | Catano | 358/140 |

*Primary Examiner*—Richard Murray
*Attorney, Agent, or Firm*—Robert F. O'Connell

[57] ABSTRACT

To provide improved resolution of a television, e.g. CRT, display with reduced large-area flicker, twittering of horizontal edges, and line structure of the picture, the field rate is doubled and the number of lines per field is doubled from that of a received input television signal. Preferably a $2\frac{1}{2}$ field store arranged in half-field units is used, together with a four-line store arranged in one line units to provide line interpolation, which can be adaptively dependent upon the presence or absence of motion.

15 Claims, 18 Drawing Figures

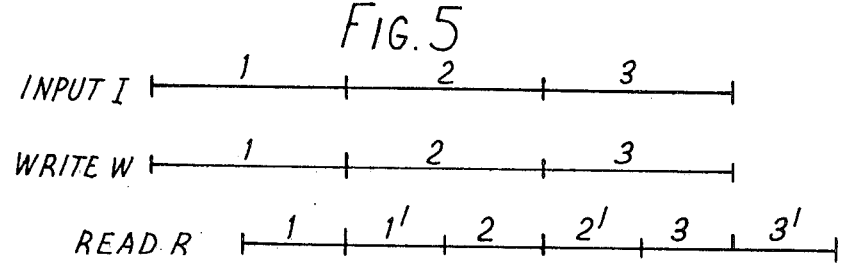
FIG. 5
FIG. 6
FIG. 7
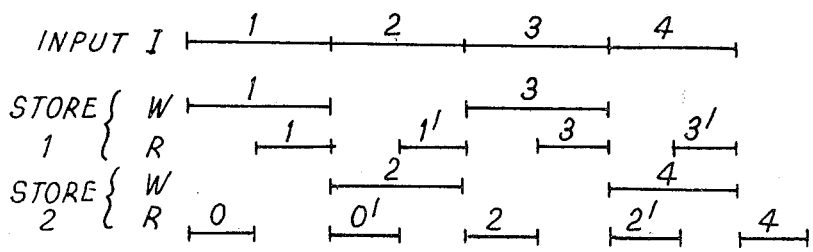

FIG.18

TELEVISION DISPLAY SYSTEM

BACKGROUND OF THE INVENTION

This invention relates to a television display system for displaying television pictures, such as transmitted by broadcast television, using a display device such as a cathode ray tube which operates by raster scanning on a field and line basis.

In a television display system the display unit is required to fill the gaps or interpolate between the samples taken by the field and line scanning. This scanning effectively samples the scene vertically (by means of a succession of lines) and temporally (i.e. in time, by means of a succession of fields). The overall response of the display unit is determined by a combination of the scanning spot profile and the persistence characteristic of the screen, and the scan rates.

Failure to interpolate adequately results in various impairments, chief of which are: large-area flicker at the field frequency, 'twittering' of sharp horizontal edges at the picture frequency (assuming 2:1 interlaced scanning), static line structure of the picture, and travelling line structure of the field (line crawl). These effects are undesirable, especially if the display fills much of the visual field, as the line structure is then more easily visible and the eye perceives flicker more easily in the peripheral region of the field of view. Morever the critical flicker frequency, above which the eye does not perceive flicker, increases as the display luminance increases and, over the years, displays have increased in brightness to the point where the field frequency of conventional television, (50 Hz in the UK), is too low to prevent annoying flicker even on ordinary domestic displays.

We have appreciated that conventional cathode ray tube displays, by themselves, are inherently incapable of performing this interpolation function adequately because their spot profiles and persistence characteristics are subject to severe physical contraints which do not satisfy the conditions for ideal interpolation.

SUMMARY OF THE INVENTION

It is thus an object of the present invention to improve the display quality of a television display system. It is a particular object of the invention to provide improved display of broadcast television signals of a type transmitted with standard line and field format.

Accordingly, in accordance with this invention a preferred television display system provides for increasing the number of fields per second and/or lines per field to improve the quality of the resultant display. If a conventional cathode ray tube is used to display extra lines and fields the horizontal and vertical scan rates may be increased to accommodate the increased rate of information display. The line and field rates are both proportional to the number of fields per second whilst the line rate is also proportional to the number of lines per field. The interpolation of extra lines and fields requires simultaneous access to the signals on several adjacent incoming lines and fields. This can be provided by storage with a capacity of one or more fields, organised in a way appropriate to the particular interpolation method.

BRIEF DESCRIPTION OF THE INVENTION

Further objects and advantages of the invention will become apparent from a consideration of the following description taken with reference to the drawings, in which:

FIG. 5 illustrates the timing of the write and read operations in the system of FIG. 3;

FIG. 6 is a spatio-temporal diagram for a system using a store capacity of two fields;

FIG. 7 is a timing diagram illustrating the writing and reading operations with the system of FIG. 6;

FIG. 18 is a write/read timing diagram illustrating the use of serial access storage.

DETAILED DESCRIPTION OF THE PREFERRED EMBODIMENTS

Three specific examples of the use of the invention will now be given, and which require storage with minimum capacities of 1, 2 and $2\frac{1}{2}$ fields respectively. As the storage capacity increases, more of the impairments of the conventional system which are mentioned above are eliminated or reduced. However other storage capacities can be used to advantage, e.g. to improve the portrayal of moving objects.

Figure 1:
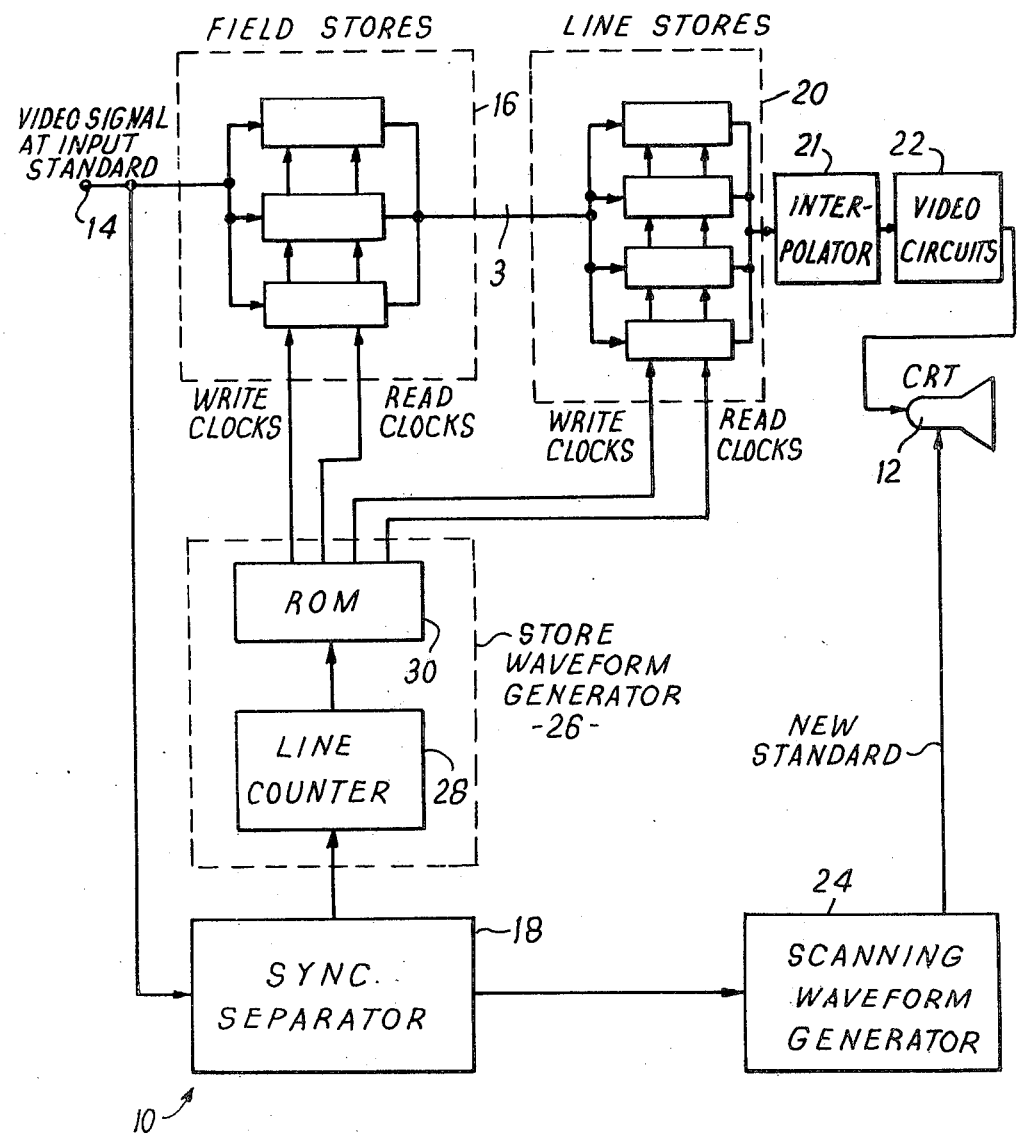
FIG. 1 is a block circuit diagram of a television display system embodying the invention.

Reference is first made of FIG. 1 of the drawings which shows a block diagram of a television display system 10 embodying the invention. The system can be part of a broadcast television receiver or a television monitor for example, and incorporates a cathode ray tube (C.R.T.) 12. An input 14 receives a video signal which it applies to field stores 16. The output of the field store circuit 16 is applied if required to a line store circuit 20 and associated interpolating circuit 21 the output of which is in turn applied to video circuits 22 which, apart from alterations arising from the change in line and/or field rate, are entirely conventional. The output of the video circuits 22 is applied to the C.R.T. 12.

The input video signal also feeds a synchronising (sync) pulse separator 18 which provides one output to a scanning waveform generator 24 which again is of conventional construction except insofar as it is adapted to operate at a different field and/or line rate, and another output to a store waveform generator 26. This generator 26 can for example be implemented by means of a line counter circuit 28 which reads from a pre-programmed read-only memory (ROM) 30 to control which of the field and line stores in the field and line store circuits 16 and 20 are being written into and read from at any instant.

With the illustrated system a monochrome television signal received at a standard 525/60 or 625/50 format is stored, as will be described below, and read from the stores at a different rate such as in any of the following formats, viz:

| For a 525/60 input signal | For a 625/50 input signal |
| --- | --- |
| 525/120 | 625/100 |
| 1050/60 | 1250/50 |
| 1050/120 | 1250/100 |

For operation with composite colour signals, the composite signal may first be decoded into its luminance and colour difference components, each of which may be processed by a system of the type illustrated, or the three components may be time division multiplexed in some suitable form and a single system used. Alternatively, where no line or field interpolation takes place, the composite signal may be processed directly and the output signal decoded by a decoder specially adapted to take account of the increased frequency and phase discontinuities of the processed sub-carrier.

Specific examples of the use of the system will now be given with reference to the remaining figures.

In the following, the numerical examples will relate to a 625-line system.

FIG. 1 shows a purely arbitrary number of units in each of the field and line store circuits 16 and 20. The number and size of each of these units will depend upon the details of the individual system as will become apparent from the following description. In particular the line store circuitry 20 and interpolator 21 are omitted in the simpler initial examples.

It will first be assumed that the field store 16 contains a one-field delay, the line store 20 and interpolator 21 not being present. Each field is displayed and then repeated by successive reading from the field store.

Figure 2:
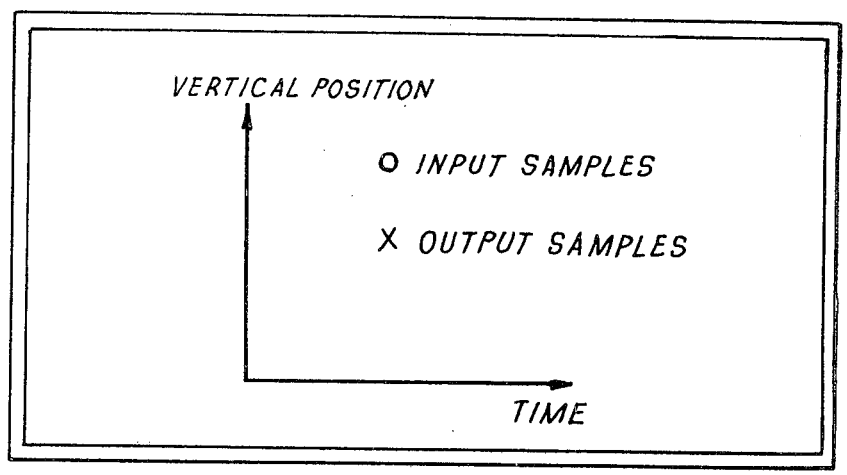
FIG. 2 illustrates the conventions used in some of the subsequent figures.
Figure 3:
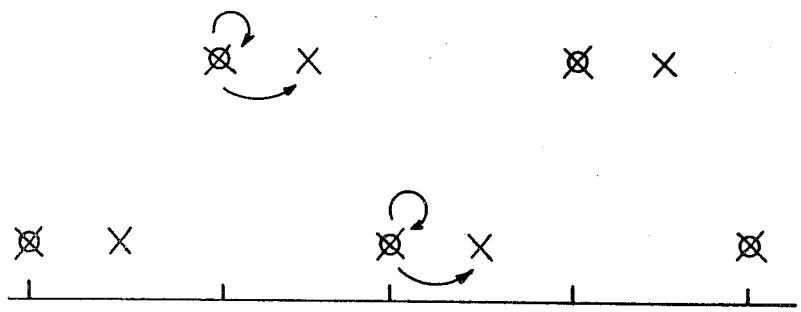
FIG. 3 is a spatio-temporal diagram using the convention of FIG. 2 and illustrating the operation of a system using a one-field store.

FIG. 3 is a spatio-temporal diagram illustrating the operation of such a system, the conventions used being indicated on FIG. 2. The circles on FIG. 3 indicate the interlaced line structure of the incoming fields and indicate the vertical positions of a small number of the lines of the input signal plotted against time, measured in field periods of the input signal.

As seen from FIG. 3, each field is simply repeated, the field rate being doubled, so that no memory beyond one field period is required. Each repeated field immediately follows the field from which it is derived. The interlaced fields of the input signal are of course in the sequence: even-odd-even-odd, but the fields of the modified signal derived from it are therefore in the sequence:

Even-even-odd-odd-even-even-odd-odd.

Figure 4:
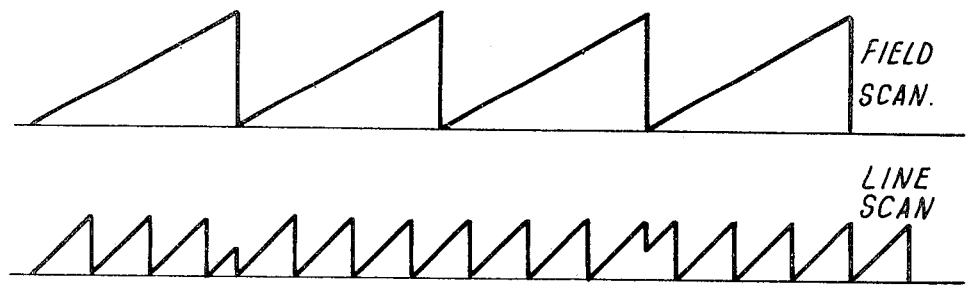
FIG. 4 illustrates the perturbation of the horizontal scan waveform required with the system of FIG. 3.

The horizontal and vertical scanning rates of the C.R.T. 12 are both doubled and, to ensure that the repeated fields are displayed coincident with the primary fields, the horizontal scan waveform can be perturbed as shown in FIG. 4 (the number of lines per field is reduced for purposes of explanation). Alternatively the vertical scan can be suitably perturbed.

Assuming the memory 16 is of random-access form, the timing of the write and read operations is shown in FIG. 5. The first line of this figure shows three successive fields of the input signal and the second line indicates that the input signals are written into the field store circuit 16 as they arise. From the third line it is seen that each field is read from the store twice. For example output field 2 is read from the store during the second half of input field 2 and the repeated output field 2' is read from the store during the first half of input field 3. The store must therefore be of a type which permits independent simultaneous writing and reading at different rates. The essential condition is of course that information is never required to be read from the memory before it is written and that it is never overwritten before it is wanted.

In this embodiment the frequency of the large-area flicker is doubled (to 100 Hz or 120 Hz) and it therefore becomes imperceptible. The twitter at the picture frequency and travelling line structure are attenuated, but the static line structure is unaffected.

A storage capacity of 2 fields allows pairs of interlaced fields to be repeated so that information with the spatio-temporal structure of FIG. 6 can be interpolated. Unlike the previous example, this provides a genuine 2:1 interlace structure with a field rate double that of the input.

From FIG. 6 it is seen that each input field is again stored and outputted twice. However the output fields are now presented in the conventional Even-odd-even-odd sequence, although naturally at double the input field frequency. The required horizontal and vertical scans of the C.R.T. 12 are the same as in the previous example except that the perturbation in, say, the horizontal scan is not required.

The memory 16 is conveniently organised as two stores each of 1 field capacity, and the cycle of writing and reading operations is as shown in FIG. 7. Odd fields are written into one store and even fields into the other. The contents of each store are read alternately at twice the incoming rate, and with the relative phasing of writing and reading as shown in FIG. 7, it is possible to read the contents of each store twice before they are overwritten.

Figure 8:
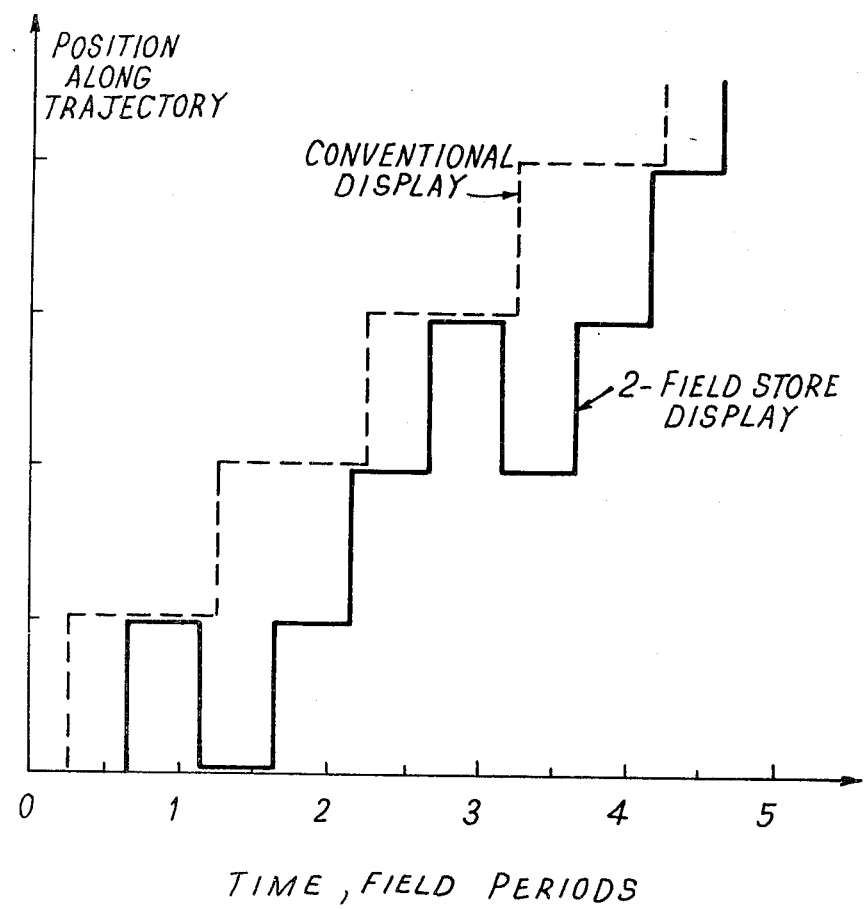
FIG. 8 illustrates how the system of FIG. 6 modifies the portrayal of a moving object.

In this example the frequencies of the large-area flicker and the 'twitter' are both doubled. Thus the flicker is imperceptible and the 'twitter' almost so, allowing the eye to integrate better the contributions from both fields resulting in better perceived vertical resolution. The line structure of the field travels at twice the rate making it marginally less perceptible, but the static line structure of the picture is again unaffected. A picture-frequency component is, however, introduced into the apparent motion of translating objects when the picture is not derived from conventional film. The variation, as a function of time, in the displayed position of a steadily moving object along its trajectory is illustrated in FIG. 8. For a conventional television display the motion is as shown by the dashed staircase line marked "conventional display". For the embodiment outlined in FIGS. 6 and 7 the object will be displayed according to the full line.

Figure 9:
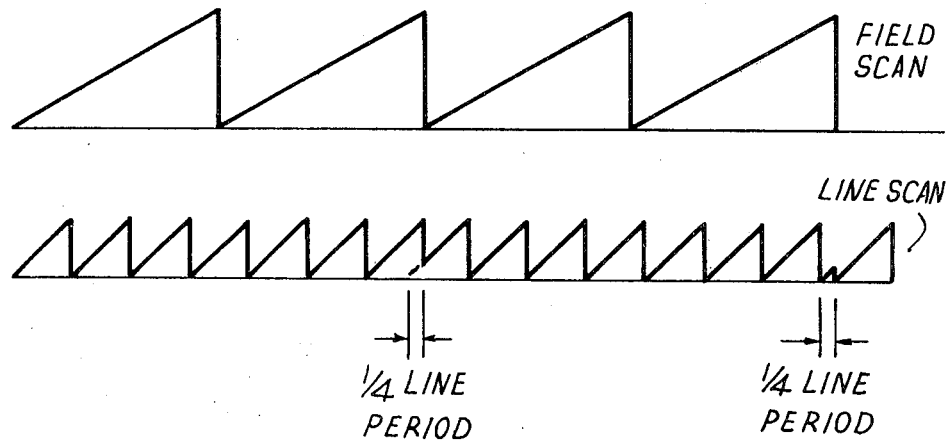
FIG. 9 shows the horizontal scan waveform for a system based on FIG. 6 in which the output lines are displayed in positions relatively displaced by half the spacing of the lines of the input picture.

As a variation of this embodiment, the repeated field pairs can be displayed in positions vertically displayed by half the spacing of the incoming picture lines, either by perturbing the horizontal scan as shown in FIG. 9, or by a suitable perturbation of the vertical scan. This would provide a quadruple interlace and effectively double the number of lines per picture. The penalty paid is a reintroduction of 'twitter' at the original picture frequency, although this will be less perceptible than before, because the inter-line separation is reduced.

Figure 10:
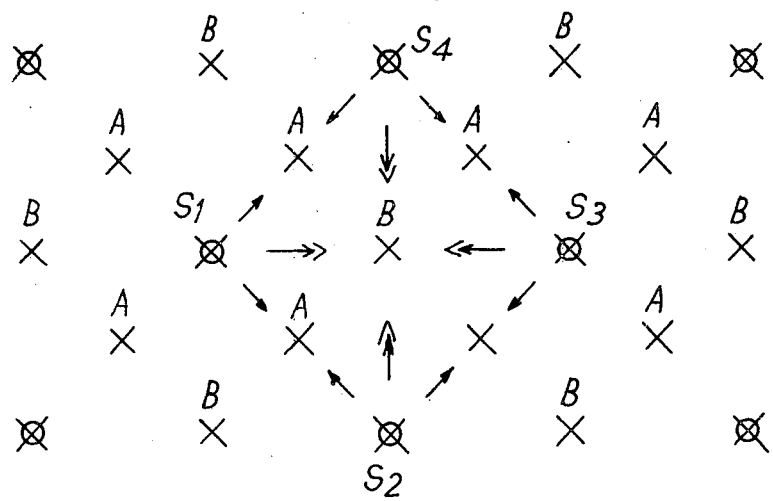
FIG. 10 is a spatio-temporal diagram for an alternative system using a storage capacity in excess of two fields.

Using nominally the same storage capacity of 2 fields, it is also possible to interpolate to provide information having the spatiotemporal structure of FIG. 10. This is a 2:1 interlaced structure with both the field rate and the number of lines per picture doubled as compared with the input signal giving a four-fold increase in sample density. Thus the horizontal scanning rate of the CRT 12 must be quadrupled, although the vertical scanning rate need only be doubled. Also, the line storage circuitry 20 and interpolator circuitry 21 are now required.

The samples marked A in FIG. 10 may, in the simplest case, be the mean of the two nearest neighbours, i.e. of adjacent input picture lines, as shown by the single-headed arrows, but higher-order interpolation could be used. The samples marked B in FIG. 10 may be derived from three of the nearest neighbouring input samples i.e. two in the same field and one in an adjacent field, the fourth being inaccessible if only 2 fields of storage are available. Alternatively, if 2½ fields of storage are available then the B samples may be derived from all four nearest neighbours, as shown by the double-headed arrows.

In either case it would be preferable to have an adaptive mode of interpolation for the B samples. If there is no movement, the ideal sample value is identical (neglecting the effects of noise) to those spatially coincident samples in the adjacent fields. If there is gross movement, however, the value should more nearly resemble adjacent samples in the same field. Thus, where there is movement, the B samples could be interpolated from the samples in only the same field, and in the simplest case could consist of the mean of the two nearest "same field" neighbours. Where there is no movement the B samples could be equal to the nearest "adjacent field" neighbour, or preferably to the mean of both nearest "adjacent field" neighbours where these are accessible.

Figure 11:
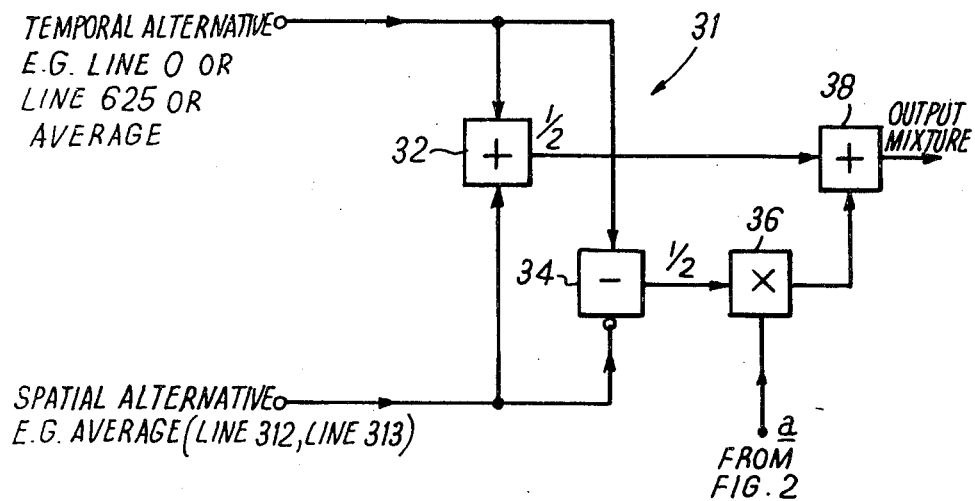
FIG. 11 is a block diagram of an adaptive interpolation circuit for use in the system of FIG. 10.

The change of mode of interpolation is preferably gradual and can be accomplished by the circuit 31 of FIG. 11. The two values obtained by the alternative interpolation methods are averaged in an averager 32 and also semi-differenced in a halving subtractor 34. The semi-difference is multiplied in a multiplier 36 by a quantity a and the result is added in an adder 38 to the average. The sum represents a mixture of the alternatives which varies from pure spatial to pure temporal interpolation as a varies from $-1$ to $+1$.

The value of a is governed by a movement detector. Where both the "adjacent field" nearest neighbours are available, such a detector may be based on the relative magnitudes of the field-to-field and line-to-line differences between the pairs of samples surrounding the B samples. If $D_T$ and $D_S$ are the magnitudes of these field-to-field and line-to-line differences respectively, i.e. referring to FIG. 10:

$$D_T = |S_3 - S_1|$$

and $$D_S = |S_4 - S_2|$$

then a suitable relationship between them and the value of a is given by:

$$a = (D_S - D_T)/(D_S + D_T).$$

Figure 12:
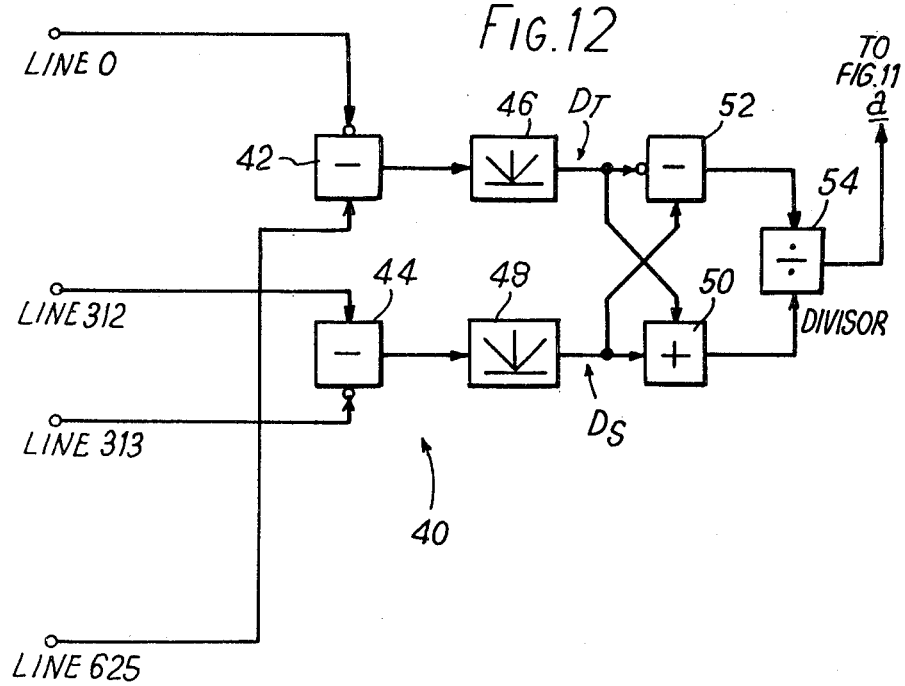
FIG. 12 is a block diagram of a circuit for devising the control waveform for the circuit of FIG. 11.
Figure 13:
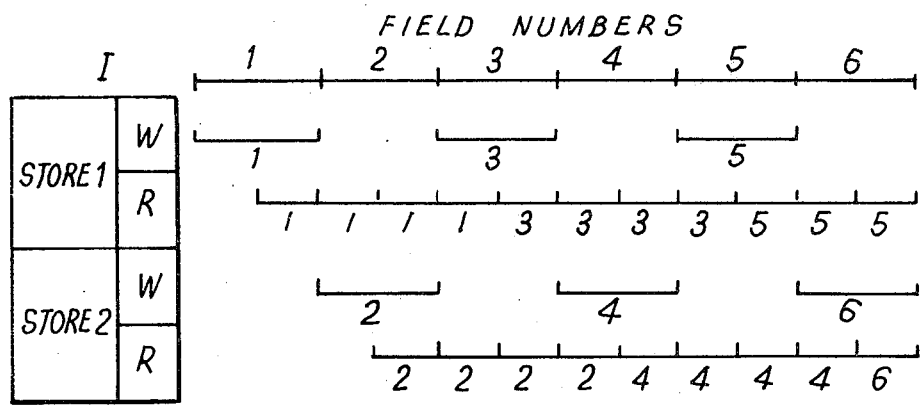
FIG. 13 is a write/read timing diagram for a system based on FIG. 10 with two one-field stores.
Figure 14:
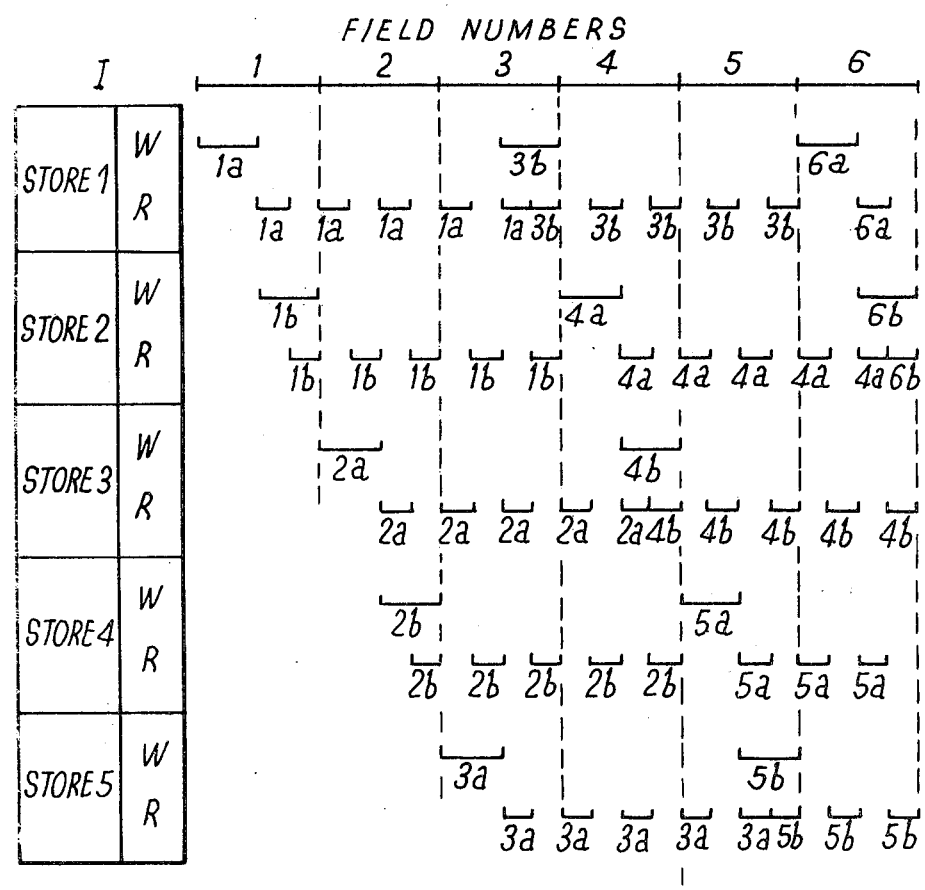
FIG. 14 is a timing diagram for a system based on FIG. 10 with a storage capacity of $2\frac{1}{2}$ fields arranged as five units of half a field.

FIG. 12 illustrates a suitable circuit 40 for implementing such a relationship. Two subtractors 42, 44 respectively take the difference between the content of lines 0 and 625 and of lines 312 and 313. Circuits 46 and 48 take the modulus of these differences respectively to give $D_T$ and $D_S$. An adder 50 generates $D_S + D_T$ and a subtractor 52 generates $D_S - D_T$ and these two quantities are divided in a divider 54 to give a.

Where only one "adjacent field" neighbour is available such a detecting principle cannot apply and other means of adaption must be sought. One possibility is to set a to $+1$ if the "adjacent field" neighbour value lies between the "same field" neighbour values, but to $-1$ otherwise.

Where only 2 fields of storage are available the memory is conveniently organised as two stores each of 1 field capacity. FIG. 13 shows the cycle of reading and writing operations. Odd input fields are written into one store and even fields into the other. The contents are withdrawn at twice the incoming rate in such a way that each field is paired twice with its preceding neighbour and twice with its following neighbour, i.e. two repetitions of field 3 are contemporaneous with repetitions of field 2 and two with repetitions of field 4. A convention is required to determine whether type A or type B fields (i.e. fields containing A or B samples) are generated during the first reading of any particular pair of input fields.

Where 2½ fields of storage are available the memory is conveniently organised as 5 stores each of ½ field capacity. FIG. 14 shows the cycle of reading and writing operations in this case. Successive half fields are written into successive stores analogous to a commutator action, i.e. the first half of field 1 is written into store 1, the second half into store 2, the first half of field 2 into store 3 and so on. Pairs of fields alternating with triplets of fields are withdrawn at twice the incoming rate, i.e. the output fields sequence is (1,2), (1,2,3), (2,3), (2,3,4) . . . . The pairs are used to generate type A fields and the triplets are used to generate type B fields.

In either the 2-field or the 2½-field case the information emerging from the field stores has the required field rate but the same number of lines per field as the original standard. On the other hand the type A and B fields contain twice the number of lines, as is seen from FIG. 10, with a further doubling of the line frequency. The generation of the extra lines at the correct rate can be achieved using further auxiliary line store circuitry 20 comprising units of one line and combining means 21. The 2-field case requires 3 line stores and the 2½-field case requires 4 line stores.

Figure 15:
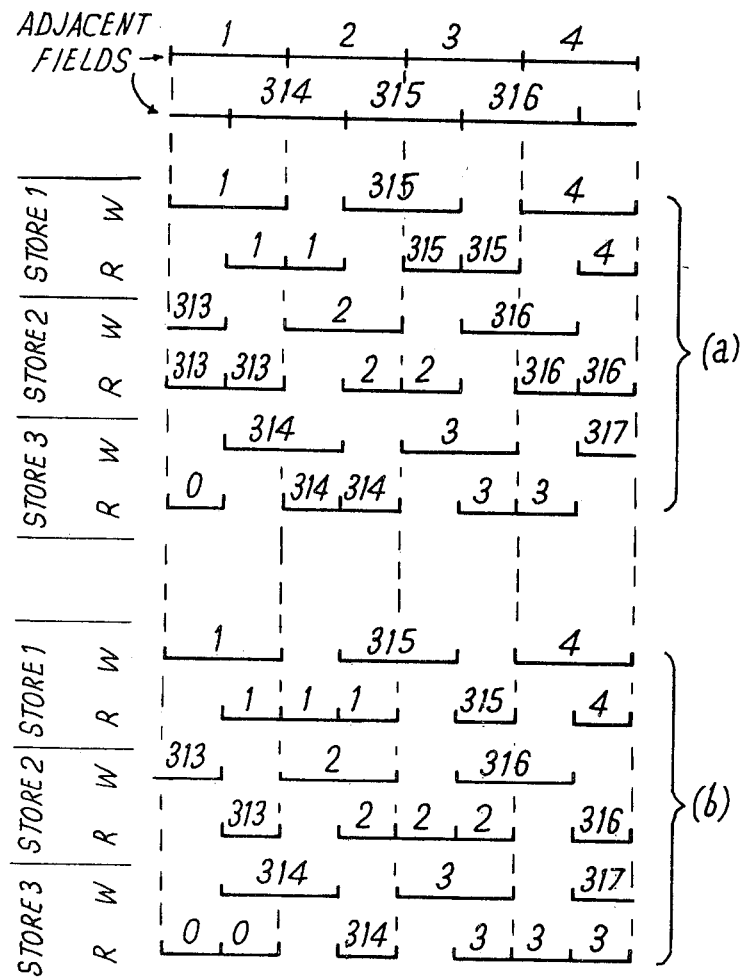
FIG. 15 is a write/read timing diagram for the individual line units of a three-line store for use with the two-field store to provide line interpolation.

FIG. 15 shows the writing and reading cycles of the 3 line stores needed for the 2-field case. Generation of type A fields is shown at (a) and of type B at (b). Information is withdrawn at twice the incoming rate; the output line sequence for type A fields is (1,313), (1,314), (2,314), (2,315) . . . and for type B fields 1, (1,314,2), 2,(2,315,3) . . . . For B sequence generation the line stores require the two input fields to be staggered in time by half a line period. Hence this stagger must apply to the output of the two field stores. (This is too small be shown in FIG. 13). The A sequence can be obtained with only two line stores, but by using all three stores the store cycles can be made equal but staggered in phase. The lines of type A fields are obtained simply by averaging the two contributions in each pair; the lines of type B fields are obtained alternately direct or from the triplets via the adaptation circuit of FIG. 11.

Figure 16:
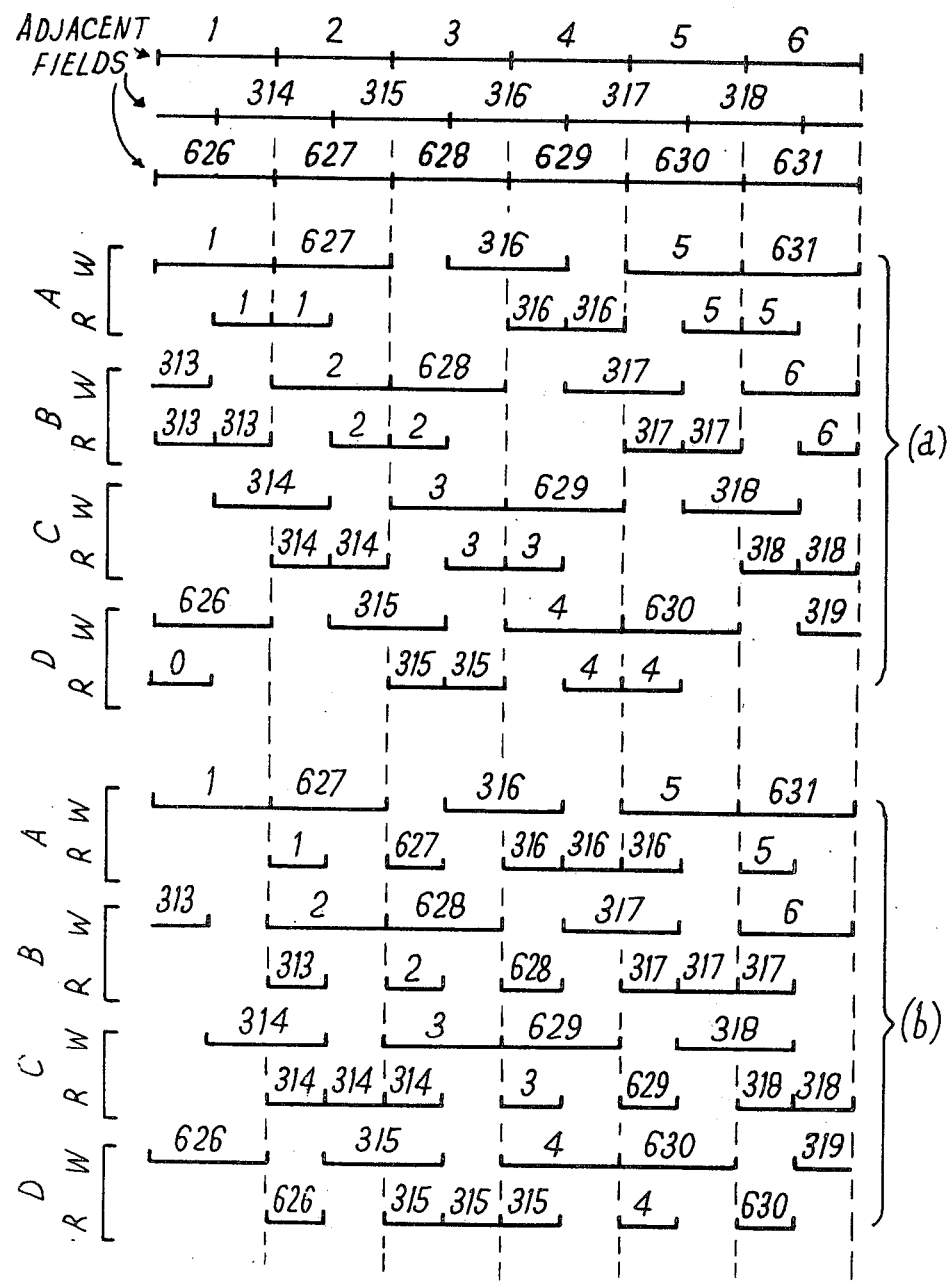
FIG. 16 is a write/read timing diagram for the individual line units of a four-line store for use with the $2\frac{1}{2}$-field store.

FIG. 16 illustrates the writing and reading cycles of the 4 line stores needed for the 2½-field case. Generation of type A fields is shown at (a) and of type B at (b). The output line sequence for type A fields is, as before, (1,313), (1,314), (2,314), (2,315) . . . and for type B fields is now 313, (1,313,314,626), 314,(2,314, 315,627) . . . . For B sequence generation the timing requires the middle input field to be staggered by half a line period which therefore applies to the field store outputs as shown in FIG. 14. As before the generation of the A field requires one less line store but economy in waveform generation can be achieved by using all four stores. The lines of the two types of fields are obtained as before except that the adaptation circuit now takes 4 contributions.

Figure 17:
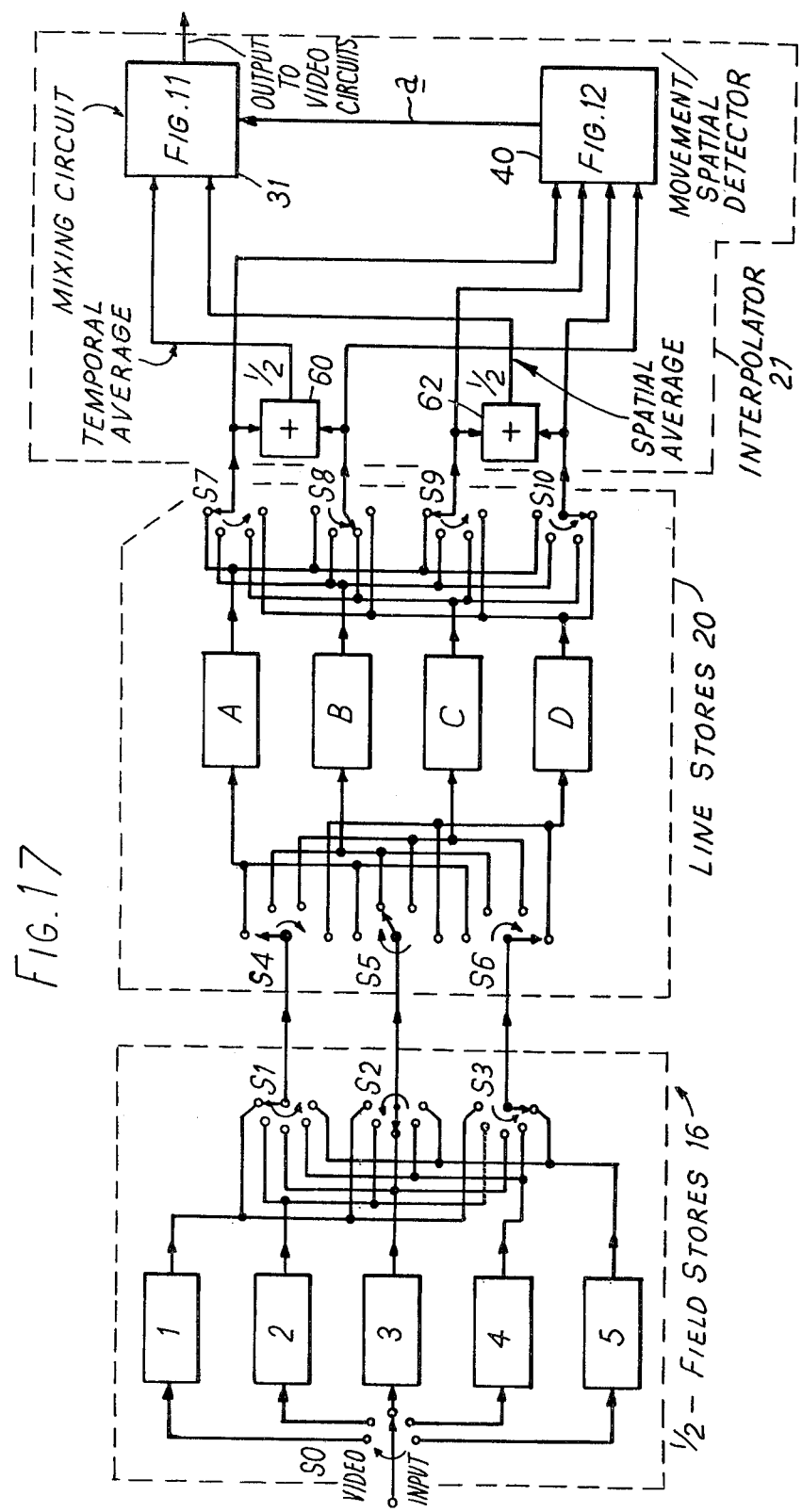
FIG. 17 shows in detail the contents of boxes 16, 20 and 21 of FIG. 1 which applies to the most complex embodiment described hereinafter, in the simpler embodiments parts of the diagram are omitted as will become clear in the following description.

FIG. 17 shows how the field and line stores, interpolator, and movement detector are interconnected for this case. In FIG. 17 the components 16, 20 and 21 are seen in greater detail. The field stores 16 take the form of five half-field stores labelled 1 to 5, together with an input switch S0 which distributes the video input signal to the half-field stores and three output switches S1, S2, S3 which select signals which are one-field apart. The lines stores are four one-line stores labelled A to D and are provided with input switches S4 to S6 and output switches S7 to S10 connected as shown. The switches S0 to S3 operate at a rate related to the field rate whereas the switches S4 to S10 operate at a rate related to the line rate. The outputs of switches S7 and S8 are averaged in a halving adder 60 and the outputs of switches S9 and S10 are averaged in a halving adder 62. It will be appreciated that the various desired combinations of lines can be obtained by suitable operation of the switches S7, S8, S9 and S10. The output of the two halving adders 60, 62 constitute the inputs to the circuit 31 of FIG. 11 while the outputs of the four switches S7 to S10 form the inputs to the circuit 40 of FIG. 12 which controls the circuit 31. The output of the circuit 31 is applied to the video circuits 22 (FIG. 1).

In this example the frequency of the large-area flicker is doubled, making it imperceptible, and, depending on the adaptation mode, the 'twitter' is either eliminated on stationary pictures or attenuated by not less than 6 dB on moving pictures. The line structure of the field travels at the same rate but is twice as fine as in the input signal, as is the static line structure of the picture, making both these effects far less perceptible. Moreover there is no modification of the portrayal of movement.

The use of the additional line store circuitry 20 and interpolator 21 to interpolate additional lines is particularly desirable, in that it considerably improves the resolution of the display and is more than a simple repetition of the lines, as the content of the added lines is modified to take account of their new positions.

It can be shown that the effect of the systems described is to synthesise for the display a vertical/temporal aperture function which is the resultant of superposing displaced versions of the unaided aperture function, the various displaced apertures being weighted in accordance with a desired profile. This results in a display aperture function which is nearer to the theoretical ideal aperture.

In the examples illustrated a considerable economy of storage is achieved by allowing simultaneous writing and double rate reading of the same store, with the reading and writing operations starting or ending together. This can only be achieved using random access storage. Serial access storage can however be used provided that n+1 blocks of storage of capacity (1/n)th of the total equivalent random access amount is used. The stores can be constructed as digital stores where digital signals are being processed, but it is also possible to use analogue stores (e.g. analogue CCD serial stores).

Figure 18:
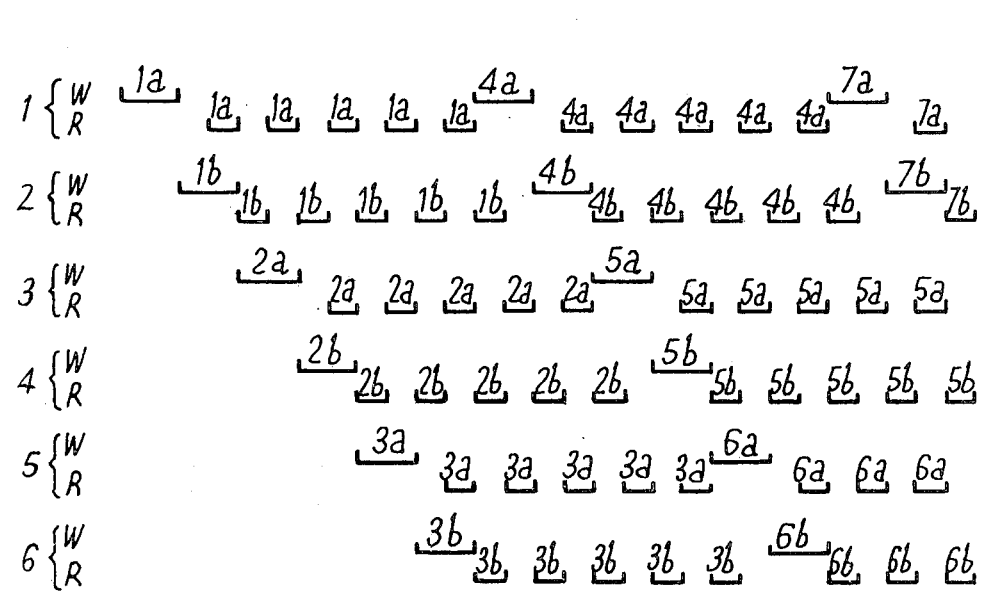

The write/read diagram of FIG. 18 illustrates the use of serial stores for the 2½ field random access case where six blocks of a ½-field capacity are used to perform the field re-arrangement function. Note that writing and double rate reading of a particular store do not take place at the same time. With such stores the information must be recirculated on reading if required subsequently.

What we claim is:

1. A television display system comprising,
    input means adapted to receive a video signal representative of a moving scene and having a defined line rate and a field rate of 50 to 60 interlaced fields per second;
    store means connected to the input means for storing at least part of the input video signal;
    display means for displaying a television picture;
    scan control means for causing said display means to scan with the field rate increased from the field rate of the input signal by a factor of at least substantially two and with the line rate increased from the corresponding rate of the input signal by at least substantially the same factor; and
    means for selecting in accordance with the scanned location from the stored signal portions the appropriate signal portion for application to the display means.

2. A television display system according to claim 1, in which the scan control means is adapted to double the field rate.

3. A television display system according to claim 2, in which the scan control means is adapted to double the number of lines per field.

4. A television display system according to claim 3, in which the store means has a capacity of substantially 2½ fields arranged in half-field units.

5. A television display system according to claim 2, in which the store means has a capacity of substantially one field.

6. A television display system according to claim 2, in which the store means has a capacity of substantially two fields.

7. A television display system according to claim 1, in which the scan control means is adapted additionally to double the number of lines per field.

8. A television display according to claim 7, in which the store means indicates a store element having a capacity of a small plurality of lines.

9. A television display system according to claim 7, in which the signal portion selection means provides information for at least some of the displayed lines by interpolation between lines of the input signal.

10. A television display system according to claim 1, in which the scan control means comprises line counting circuitry.

11. A television display system according to claim 1, in which the store means comprises a field store section having a capacity of at least one field and a line store section having a capacity of at least one line arranged in units of one line.

12. A television display system according to claim 1, in which said signal portion selection means is adapted to derive even and odd output fields respectively from even and odd input fields.

13. A television display system comprising:
   input means adapted to receive a video signal representative of a moving scene and having a defined line and field rate;
   store means connected to said input means for storing at least part of the input video signal;
   display means for displaying a television picture;
   scan control means for causing said display means to scan with a field rate which is double the field rate of the input signal and with a line rate which is at least double the line rate of the input signal; and
   means for selecting in accordance with the scanned location from the stored signal portions the appropriate signal portion for application to said display means.

14. A television display system according to claim 13, in which said scan control means is adapted to quadruple the line rate.

15. A television display system according to claim 13, in which said store means has a capacity of at least two fields, and said signal portion selection means is adapted to derive even and odd output fields respectively from even and odd input fields.

* * * * *